March 21, 1933.  H. N. JENKS  1,902,078
MIXING DEVICE OR SEWAGE TREATMENT PLANT
Filed Oct. 21, 1929  2 Sheets-Sheet 1
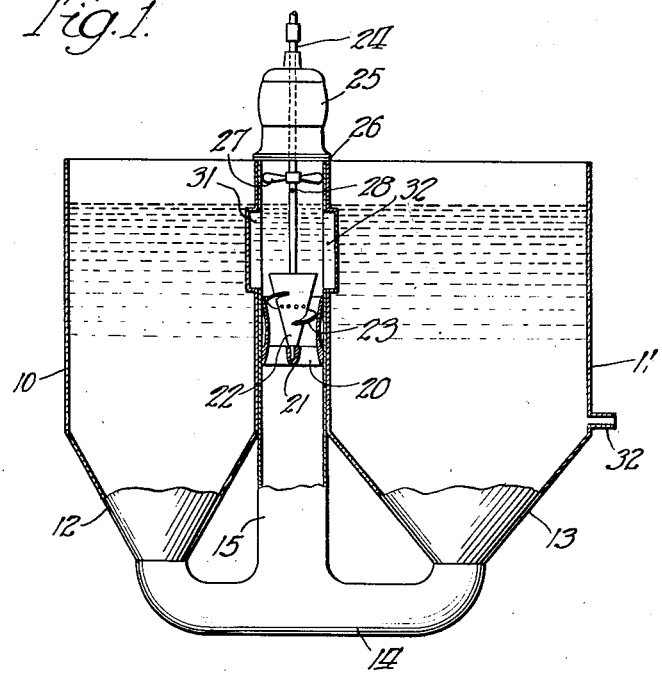
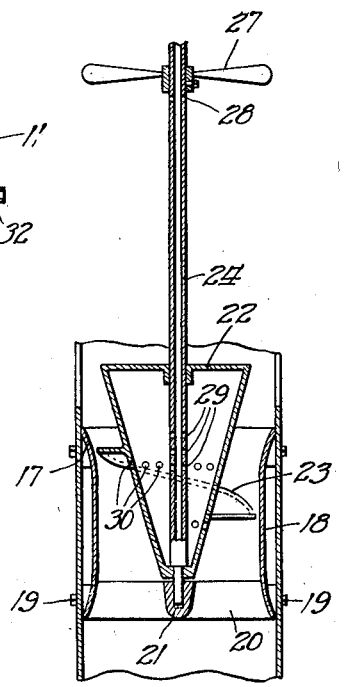
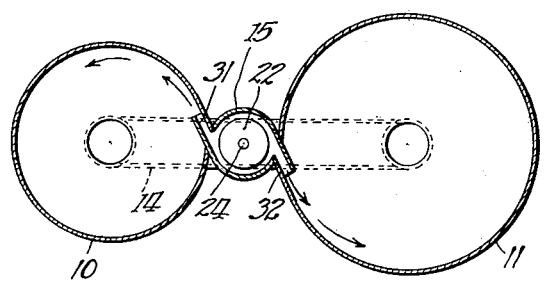
Inventor
Harry N. Jenks
By John P. Smith
Atty.

March 21, 1933.  H. N. JENKS  1,902,078
MIXING DEVICE OR SEWAGE TREATMENT PLANT
Filed Oct. 21, 1929  2 Sheets-Sheet 2
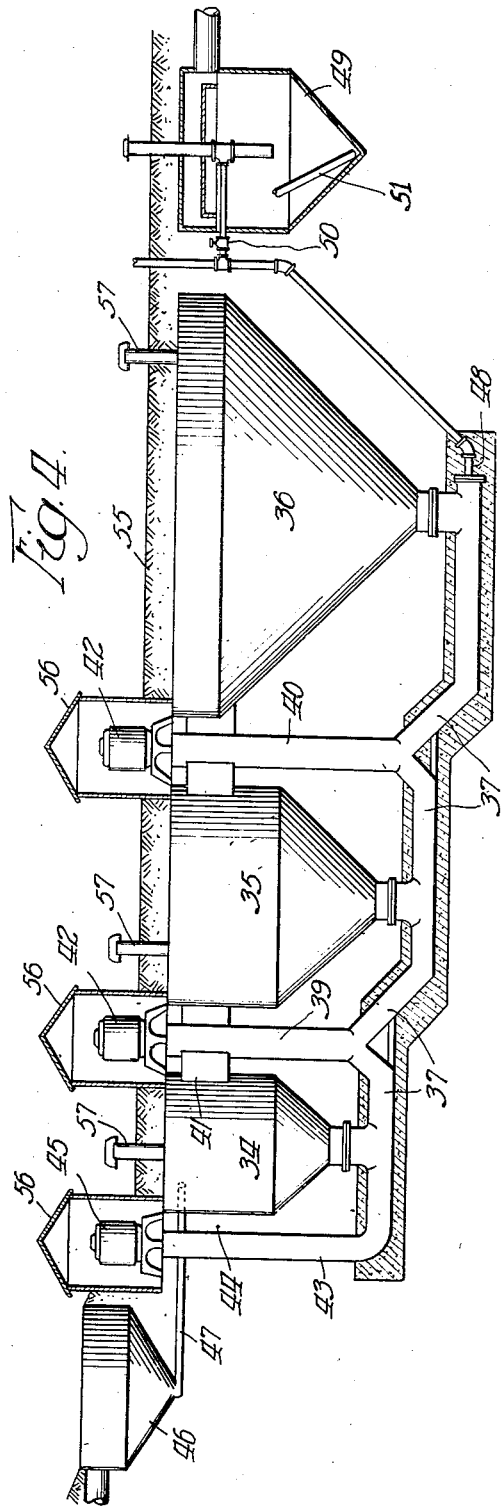
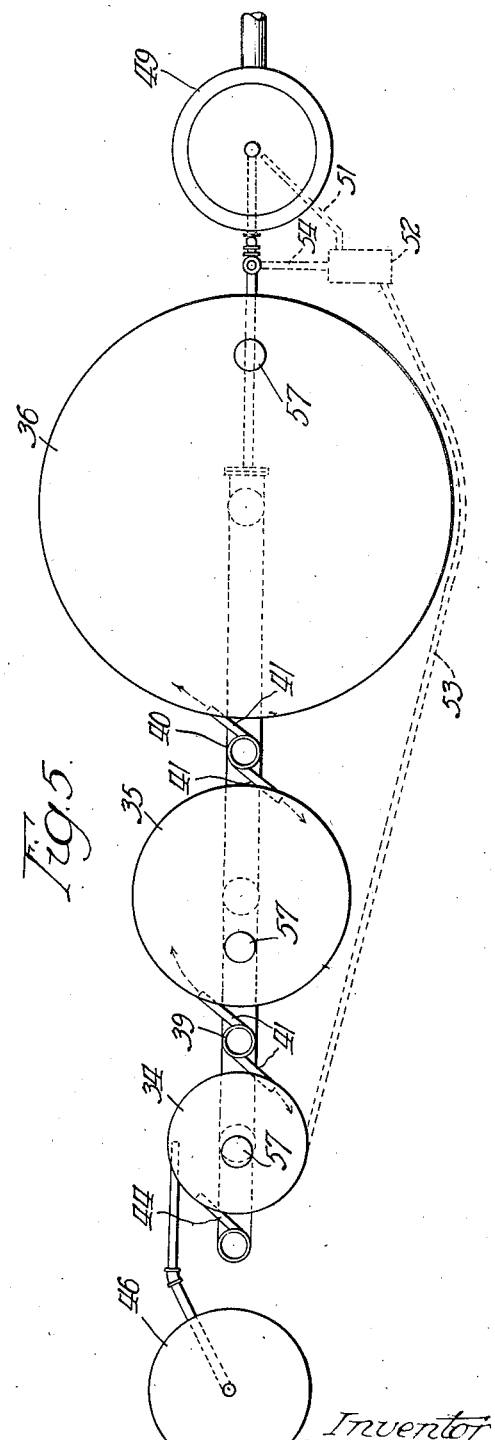
Inventor
Harry N. Jenks
By John P. Smith Patented Mar. 21, 1933

1,902,078

UNITED STATES PATENT OFFICE

HARRY NEVILLE JENKS, OF SAN JOSE, CALIFORNIA

MIXING DEVICE OR SEWAGE TREATMENT PLANT

Application filed October 21, 1929. Serial No. 401,075.

My invention relates to improvements in a mixing device for thoroughly mixing liquids of various kinds, but has particular adaptation to the construction of an activated sludge aeration and mixing unit in which the sewage or organic wastes in general may be purified by oxidizing organisms deriving their oxygen supply from that which is absorbed by the liquid directly from the atmosphere.

My invention may be also used advantageously in the aeration and mixing of all liquids of whatever character, and particularly in the treatment of water as well as of sewage.

One of the objects of the present invention is to provide an improved device of this kind in which a novel means is provided for supplying the required amount of oxygen for the maintenance of aerobic conditions within the fluid wastes being treated, and so insure a satisfactory purification of the same.

A further object of the invention is to provide an improved construction of a sewage treatment plant wherein the sewage is partly or wholly saturated with atmospheric oxygen by natural absorption through its surface as it flows in a generally spiral path along a vertical axis superficially over and downward through a tank or zone of bacterial activity in which the oxygen so absorbed is utilized by these micro-organisms in oxidizing the organic matter to more nearly stable compounds.

A still further object of the invention is to provide an improved means whereby the organic wastes being treated in the device or plant may be continuously recirculated over the free surface of and through the body of the sewage being treated, so that a sufficiency of atmospheric oxygen may be so absorbed.

An additional object of my invention is the provision of means for introducing, particularly within the pumping device used for recirculation, air or oxygen under pressure to assist in supplying the requirements of purification in this respect.

A still further object of my invention is to provide an improved construction of a sewage treatment plant which will contain a zone wherein activated sludge may be developed and maintained without necessarily admitting compressed air through diffuser plates or otherwise, the desired bacterial activity and consequent purification being established and sustained by the absorption of atmospheric oxygen through surface contact with the air.

An additional object of my invention is to provide an improved sewage and industrial waste treatment device or plant which will simulate in principle of operation more closely than any existing types of devices or plants the fundamental phenomena responsible for self-purification of sewage polluted streams when flowing in a series of whirlpools with consequent thorough mixture in overturning of the liquid, permitting rapid surface aeration or surface absorption of atmospheric oxygen.

A further object of my invention is to provide a mixing device or sewage treatment plant in which the liquid flowing therethrough follows a path described by a vortex, whereby a substantial portion of the liquid wastes or the sludge is evaporated.

A further object of the invention is to provide a construction of the improved sewage treatment plant which will result in the reduced cost of construction as well as the decreased cost of operation.

These and other objects are accomplished by providing a construction and an arrangement of the various parts in the manner hereinafter described, and particularly pointed out in the appended claim.

Referring to the drawings,

Fig. 1 is a side elevational view partly in cross section illustrating one unit of my improved mixing device or sewage treatment plant.

Fig. 2 is a top plan view of my improved device shown in Fig. 1.

Fig. 3 is an enlarged vertical cross sectional view showing the construction of my improved pump used in connection with my invention.

Fig. 4 is a side elevational view of a typical application of my invention in the form of a spiro-vortex aeration plant and Fig. 5 is a top plan view of the same.

The present sewage treatment plant is based on the assumption that the biochemical oxidation taking place in the self-purification of a natural stream may be simulated and accelerated in my improved device by recirculation of the sewage in the treatment by activated sludge.

My improved device further conforms with the theory that the rate of biochemical oxygen satisfaction will proceed inversely proportional to the time as in natural flowing streams, except that the biochemical oxygen demand will be fully exerted and satisfied within a foreshortened period of time. I have determined empirically that the phenomena of reaeration occurring in a natural stream may be closely simulated by continuously exposing the sewage flow over a relatively large surface of contact with the atmosphere, the recirculated sewage passing through a zone of digestion with the activated sludge and a zone of oxygen absorption over the tank surface and the surface presented by the vortex.

I have found further from experiments that the required rate of absorption of oxygen by the liquid wastes or by the water to be aerated, may be assured through at least two general methods of design or operation. In one case the capacities of the various pumps used for recirculation may be so adjusted as to enable the liquid to be pumped in proportion to the existing oxygen demand, while in another general case, pumps of approximately equal capacity may be employed, and the size of oxidation or aeration tanks varied so that the actual turn-over of the tank contents will be in conformity with the corresponding oxygen demands existing therein.

In illustrating one embodiment of my invention, I have disclosed one unit of the same in Fig. 1 of the drawings which comprises two cylindrical tanks indicated by the reference characters 10 and 11 respectively, the tank 10 being preferably of a smaller diameter than the tank 11, the lower ends of the tanks being conical in shape as indicated at 12 and 13 respectively, and connected at their respective axial centers by common conduit or pipe 14, which in turn communicates with an upwardly or vertically extending conduit 14, 15. Mounted in the upper portion of the vertical conduit or pump cylinder 15 is a pump casing or bracket 17 which is provided with inwardly bulging annular wall 18. This bracket is secured within the casing 15 by means of bolts 19. The lower end of the pump casing 17 is provided with spider or arms 20 forming a bearing as shown at 21 in the axial center thereof. Journalled in the bearing 21 is a rotating impeller or runner 22 of a conical shell-like form, and has secured to the conical surface thereof a spirally arranged blade 23 which has the periphery thereof of a slightly smaller diameter than the inwardly bulging annular wall 18 of the pump casing 17. The pump impeller or runner 22 is secured to a hollow shaft 24 which in turn is connected to or formed as an integral part of the driving shaft of an electric motor 25 mounted on a suitable plate 26 secured to the upper end of the central cylindrical casing 15. Secured to the shaft 24 and preferably above the water line in each of the tanks 10, 11 is a fan 27. Located below the fan 27 and slightly above the water line in both tanks is a plurality of apertures as indicated at 28 through which the air pressure created by the fan 27 and above the water is forced through the tubular shaft 24. The shaft 24 is further provided with a plurality of apertures as shown at 29 through which the air passes from within the shaft to the inside of the runner or impeller amplifier 22. The runner or impeller is provided with a plurality of apertures as shown at 30 for discharging the air pressure from within the impeller runner into the liquid. This feature of introducing air or oxygen under pressure is to further assist in supplying the requirements of purification should the specific sewage wastes being treated so require. Located adjacent the upper end of the pump runner 22, and extending from the cylindrical casing 15 to the respective tanks 10 and 11 are two rectangularly arranged discharge spouts 31 and 32, which discharge the liquid tangentially in the respective tanks so as to set up a vortex by the liquid in each of these tanks.

The operation of my improved mixing device or sewage treatment plant as disclosed in Figs. 1 and 2 is as follows:

The liquid to be mixed or treated may be introduced in the tank 10 tangentially and near the top thereof, and by so doing will assist the vortex motion of the liquid. With the device operating in the manner previously described, it will be noted that by reason of the storage capacity of tank 10, the liquid will be retained therein for the desired period of time before passing in its entirety into tank 11. While the main body of the sewage liquid wastes or water as the case may be, is progressing through the biochemical oxidation zone contained in the tanks of Figs. 1 and 2, an independent and concomitant recirculation of the liquid is maintained through the medium of the improved form of pump previously described. It will be noted that the pump is positioned wholly outside both tanks and through the pipe or conduit connection 14, the liquid is drawn from below each tank 10 and 11, and discharged generally tangentially through the discharge spouts 31 and 32 as indicated by the arrows in Fig. 2 at a point near the surface of the liquid. This method of recirculation induces vortex formation within the tanks and consequent generally spiral movement of the liquid through them. Accordingly, very favorable conditions are thus provided for the absorption of oxygen, and the thorough mixing of the same with the liquid. Moreover, this mixing in turn effectively prevents the deposition of sludge or other suspended matter within the aeration tanks. Such deposition is characteristic of other aeration devices, but is a serious difficulty eliminated by my invention.

The tank 11 is provided with an outlet as shown at 33 where the liquid may be discharged therefrom either continuously or intermittently after it has been treated in the device.

It may be further pointed out that because of the manner in which the incoming liquid being discharged into tank 10 is thoroughly mixed with the tank contents of tank 10, that only a fractional part of this mixture is allowed to progress to the next tank or tank 11 in a given period of time, short circuiting of the flow from the inlet to the outlet is greatly minimized. Thus, referring to Fig. 1 of the drawings, if each of the tanks 10 and 11 contains say one thousand gallons, then a gallon of liquid entering tank 10 is immediately diluted approximately a thousand times. Then upon being withdrawn from tank 10, the original gallon cannot pass into tank 11 because the flow of recirculation is also from the bottom of tank 11. The combined flow passes upwardly through the pump, and is divided between the tanks 10 and 11 at the top. Some of the original gallon is forced through tank 10 again, and the remainder is merely passed through tank 11 with only a fraction being withdrawn at the outlet 32. In respect to the prevention of short circuiting, the continuous return of liquid to the tanks is a marked improvement over the simple stirring of tank contents by a paddle within each tank as the liquid flows from inlet to outlet.

In Figs. 4 and 5 of the drawings, I show a complete adaptation of my improved spirovortex sewage treatment device so as to form a continuously operating plant in which I have employed three recirculating tanks as indicated at 34, 35 and 36, which are of relatively increasing size and diameter. These tanks like the ones shown in Figs. 1 and 2, have their lower end or bottom in conical form, and are connected to the bottom ends thereof by suitable conduits 37 to vertically extending conduits or cylindrical pump casings 39 and 40, which are located respectively between the three tanks 34, 35 and 36. The pump casings 39 and 40 are provided with tangential discharging spouts 41 for discharging the liquid from the respective pump casings into the adjacent tanks. Each of these pump casings of course are provided with the usual electric motor 42 which operatively drives the pump, not shown, within the casings 31, 40, in a manner similar to the manner in which the pump is driven shown in Figs. 1 and 2. The first tank 34 is provided with an additional recirculating conduit and pump casing as shown at 43, which in turn has a discharge spout as shown at 44 for discharging the liquid tangentially into the tank 34. This pump casing 43 is merely provided with an electric motor 45. The liquid may be continuously supplied to the tank 34 by an equalizing tank 46, which discharges the liquid into the tank 34 tangentially by means of a pipe 47. The conduit positioned below the large tank 36 is connected by suitable connection as shown at 48 to a settling tank 49, which may be controlled by the valve 50 for collecting the liquid thus treated. In order to provide a sludge return from the settling tank, a suitable pipe connection as shown at 51 may be connected in the bottom of the tank 49, together with a pump 52 and return pipe 53 to the first tank 34. This pump may be additionally connected by a pipe line as shown at 54 to the connecting conduit 48 leading from the conduit 37 to the tank 49.

From the above description, it will be seen that the liquid thus progresses through the series of tanks in a succession of whirl-pools, a condition known to be favorable to the rapid replacement of atmospheric oxygen to supply the deficiency caused by the aerobic biochemical decomposition taking place in the oxidation zones within the plant. This plant may be positioned under ground or covered by cement casing, as indicated at 55, in which a housing 56 may cover each of the electric motors and air vents 57 passing to each of the tanks 34, 35 and 36, for the purpose of supplying the oxygen therethrough.

It should be further pointed out that, although my invention provides for a new and improved construction for the satisfactory reduction in impurities of organic wastes, yet it should be understood that I do not wish to limit myself merely to this phase of the plant construction, but I wish to claim as my invention such construction in combination with various recognized appurtenances to a plant of this character.

I further claim the use of the construction described in this specification as an auxiliary unit in combination with other purification processes or plants. For example, my spirovortex aerator may be used to remove the bulk of the oxygen-demanding constituents, and in general secure bio-flocculation, of the organic matter contained in the liquid wastes preliminary to their application to subsequent treatment devices, such as a biologic filter.

In addition to the novelty of the construction of my invention for bringing about and sustaining aerobic biochemical conditions for the purification of organic wastes, the sizes and capacities of the component parts of the plant can be computed with substantial accuracy upon the known volume of flow and biochemical oxygen demanding characteristics of the wastes to be purified; and the rate of recirculation of the liquid, or the rate of turnover of the tank contents may be accurately adjusted to the decreasing oxygen requirements of the organic matter from point to point through the plant. A plant control of this nature has a direct bearing upon the economy of operation, and is in favorable contrast to the existing methods of introducing a practically uniform amount of air under pressure from start to finish of the process.

Furthermore, the spirovortex absorption of atmospheric oxygen insures an adequate oxygen supply without any expense for installation and operation of air piping and diffuser plates, which latter item is always subject to more or less serious clogging. Also, in comparison with air-washing and compressing equipment and machinery used in existing activated sludge plants, the extremely low-head pumping equipment and simple piping alone needed in the spirovortex plant is much less expensive, both in first cost and in operation.

A suitable material for the construction of the spirovortex plant is reinforced concrete for the larger sized installations, and wood or sheet steel for the smaller units. It will be noted that the plant also involves a low loss of head through the tanks during operation. There is a conspicuous absence of elaborate equipment, the essential parts of a spirovortex aerator or mixer being simply a tank and a pump. It should also be noted that my invention permits the construction of an aerator without any pumping equipment or tubes or baffles within the tank. The plant may be readily covered over, if required by severe weather conditions, or may be built underground, air being admitted through suitably spaced ventilators.

While in the above description I have described the preferred embodiment of my invention consisting of two or more tanks for the purpose of a mixing device or aeration device, it will of course be understood that a single tank may be employed in which any number of conduits may be connected with the bottom of the single tank with the upper ends of said conduits leading into and connecting with the upper end of the tank for discharging the liquid tangentially for the purpose of setting up a vortex motion of the liquid within the tank. I, therefore, do not wish to confine my invention to more than one tank as the same principle of operation is applicable to a single tank, and is, therefore, within contemplation of my invention.

An operating advantage of great practical importance is the absence of fly or odor nuisance in the vicinity of a spirovortex plant, a characteristic which it shares with activated sludge plants in general.

While in the above specification I have described my invention of a spirovortex activated sludge aeration unit or plant in which the activated sludge is capable of being produced and maintained by the methods of recirculation, it will of course be understood that modification from that disclosed in the specification may be made without departing from the scope of my invention, as expressed in the following claim.

What I claim as my invention, and desire to secure by Letters Patent is:

A sewage treatment device comprising a plurality of tanks of cylindrical form with each succeeding tank being relatively larger than the preceding tank, the lower ends of said tanks being conical in form, a conduit forming the connections between the lower ends of said tanks, and vertically extending conduits connected to said first named conduits, and positioned between the adjacent tanks, said vertically extending conduit communicating with the upper ends of the adjacent tanks, and a pump positioned in said vertical conduit for withdrawing the liquid from the bottom of the adjacent tanks and discharging it substantially tangential in the adjacent tanks for setting up a liquid vortex motion in each of said tanks.

In testimony whereof I have signed my name to this specification, on this 10th day of October, A. D. 1929.

HARRY NEVILLE JENKS.